US006699598B2

(12) United States Patent
Bretschneider et al.

(10) Patent No.: US 6,699,598 B2
(45) Date of Patent: Mar. 2, 2004

(54) LAMINAR BODY HAVING PHOSPHORESCENT PROPERTIES, PROCESS FOR PRODUCING IT AND ITS USE

(75) Inventors: Annett Bretschneider, Lauter (DE); Wolfgang Kuhn, Lauter (DE); Jurgen Wieczoreck, Garbsen (DE); Andreas Winterfeldt, Egestorf (DE)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/122,533

(22) Filed: Apr. 15, 2002

(65) Prior Publication Data

US 2002/0119333 A1 Aug. 29, 2002

Related U.S. Application Data

(62) Division of application No. 09/308,782, filed as application No. PCT/EP97/06638 on Nov. 28, 1997, now Pat. No. 6,528,186.

(30) Foreign Application Priority Data

Nov. 29, 1996 (DE) ........................................ 196 49 662

(51) Int. Cl.[7] ................................................ B32B 15/04

(52) U.S. Cl. ....................... 428/690; 428/917; 428/471; 313/506; 523/172; 252/301.36; 252/301.4 R; 427/66

(58) Field of Search ................................. 428/690, 917, 428/471; 313/506; 523/172; 252/301.36, 301.4 R; 427/66

(56) References Cited

U.S. PATENT DOCUMENTS

| | | | | | |
|---|---|---|---|---|---|
| 3,294,699 | A | * | 12/1966 | Lange et al. | 252/301.4 |
| 5,084,309 | A | * | 1/1992 | Smith et al. | 428/29 |
| 5,424,006 | A | | 6/1995 | Murayama et al. | 252/301.4 |
| 5,453,292 | A | * | 9/1995 | Gerland et al. | 427/71 |

FOREIGN PATENT DOCUMENTS

| | | | |
|---|---|---|---|
| JP | 06251876 | * | 9/1994 |
| JP | 8-165140 | | 6/1996 |

OTHER PUBLICATIONS

"Experiments with Glow–in–the–Dark Toys: Kinetics of Doped ZnS Phosphorescence", Lisensky, G.C. et al., Journal of Chemical Education, vol. 73, No. 11, Nov. 1996, pp. 1048–1052.*

* cited by examiner

*Primary Examiner*—Cynthia H. Kelly
*Assistant Examiner*—Dawn Garrett
(74) *Attorney, Agent, or Firm*—Scott Jacobson

(57) ABSTRACT

Laminar body comprising a substrate, and applied thereto on one or both sides, at least one layer containing an enamel, wherein the layer or layers containing an enamel contains at least one phosphor.

6 Claims, No Drawings

LAMINAR BODY HAVING PHOSPHORESCENT PROPERTIES, PROCESS FOR PRODUCING IT AND ITS USE

CROSS-REFERENCE TO RELATED APPLICATION

This application is a divisional of pending U.S. application Ser. No. 09/308,782, now U.S. Pat. No. 6,528,186, incorporated herein by reference, which was filed with the USPTO on Aug. 30, 1999, which in turn, claims priority to German Application No. DE19649662.4 and is a 371 of PCT Application No. PCT/EP97/06638, filed Nov. 28, 1997 both of which are also incorporated herein by reference.

The present invention relates to a laminar body comprising a substrate and, applied thereto on one or both sides, at least one layer containing an enamel, wherein the layer contains at least one phosphor. Such a laminar body has phosphorescent properties. The present invention also relates to a process for producing the above-defined laminar body, to its use for giving phosphorescent properties to an article provided therewith and to these articles themselves.

The laminar body of the invention can be used wherever a situation dangerous to people can arise as a result of sudden failure of general lighting. This can be achieved in the form of markings and safety signs in the context of a safety guidance system possessing persistent phosphorescence in order to lead persons safely along a prescribed escape route to an exit or to a safe area.

Processes for producing steel enamel having persistent phosphorescence are known. Steel enamels having persistent phosphorescence have hitherto been produced using phosphors based on zinc sulphides.

In order to be able to achieve certain minimum phosphorescence values, a relatively thick phosphor-containing enamel coating had to be chosen. These processes allow no technical possibility of enamelling thin, flexible and thus more or less universally usable substrates, e.g. foils based on aluminium or aluminium alloys.

An attempt to lower the thicknesses of the enamel layer by use of laminated films led only to laminar bodies which are partly combustible or thermally decomposable. Such laminar bodies having persistent phosphorescence display good phosphorescence values but have the decisive disadvantage of thermal decomposability. This thermal decomposition of plastics is always associated with the liberation of irritating and toxic gases and therefore makes such laminar bodies unusable for a series of applications.

It was therefore an object of the present invention to produce laminar bodies which have good phosphorescence properties, are preferably not combustible and do not liberate any irritating or toxic gases under the action of heat. Furthermore, these laminar bodies should be able to be produced in any configuration by screen printing or else by other printing processes.

In addition, the laminar bodies should be inexpensive to produce, be usable and be replaceable without problems.

These and further objects are achieved by the laminar body of the invention.

The present invention accordingly provides a laminar body comprising a substrate which preferably contains aluminium or an aluminium alloy and, applied thereto on one or both sides, at least one layer containing an enamel, characterized in that the enamel layer or layers contains/contain a phosphor.

If complete noncombustibility in use is necessary, the laminar body of the invention can be constructed so as to be free of plastics.

As substrate in the laminar body of the invention, it is possible to use any substrates which can be enamelled, in particular those based on metals, e.g. ferrous materials, materials containing aluminium or an aluminium alloy, copper-, silver-, gold- and titanium-containing materials. Preference is given to using a substrate which contains aluminium or an aluminium alloy.

Although the thickness and structure of the substrate are subject to no particular restrictions, preference is given to using perforated metal sheets having a thickness of from about 0.2 to about 2.5 mm, more preferably from about 0.5 to about 2.0 mm and in particular from about 0.5 to about 1.5 mm, or foils having a thickness of from about 50 to about 500 $\mu$m, more preferably from about 100 to about 400 $\mu$m and in particular from about 200 to about 300 $\mu$m. There is virtually no restriction in respect of the free perforation area of the perforated metal sheets, but preference is given to using perforated metal sheets having a free perforation area of from about 20 to about 45%.

For the purposes of the present invention, it is in principle possible to use as substrate all known aluminium alloys in which the most important alloying constituents are, for example, copper, magnesium, silicon, manganese and zinc and also mixtures of two or more thereof and, in smaller amounts, nickel, cobalt, chromium, vanadium, titanium, lead, tin, cadmium, bismuth, zirconium and silver and also mixtures of two or more thereof.

In addition, the laminar body of the invention comprises a layer which contains an enamel and is applied to either one or both sides of the above-defined substrate.

For the purposes of the present application, the term "enamel" corresponds to the definition given in "Email und Emailliertechnik", Petzold/Pöschmann, Deutscher Verlag f ür Grundstoffindustrie, Leipzig/Stuttgart, 2nd revised edition 1992, page 15. Accordingly, enamel is a preferably vitreous, solid material formed by melting or fritting and having an inorganic, mainly oxidic-siliceous composition which is to be melted or has been melted in one or more layers, sometimes together with additives, onto metal workpieces.

The enamel used according to the invention can be produced from an enamel frit which contains heavy metals or is free of heavy metals.

Here, the term "free of heavy metals" means that the enamel frit used is completely or essentially free of metals which have an atomic number greater than the atomic number of calcium.

In a preferred embodiment of the present invention, in which the substrate contains aluminium or an aluminium alloy, enamelling is carried out using an aluminium enamel. With regard to this, the following needs to be noted. The low melting point of aluminium and its alloys demands enamels which can be fired at from about 520° C. to 560° C. This corresponds to a softening temperature of about 450° C. Accordingly, the starting materials employed in this embodiment are enamel frits which have the abovementioned properties.

This can be achieved using, for example, glasses having a high content of $Li_2O$, BaO and $V_2O_5$. Eutectics containing fluoride or enamels based on phosphate also meet the temperature requirement. Although the abovementioned conditions in respect of the softening point can be achieved by addition of these constituents, preference is given to adding further constituents to increase the chemical resistance of the resulting enamel. Thus, for example, good values for the resistance of the resulting enamel to aggressive media can be achieved by changing the ratios of $Li_2O$ and $TiO_2$ and the contents of alkaline earth metal and ZnO. Details on this subject may be found in Migonadziev, A. S., Steklo i keramika (1966), 12, p. 15.

Aluminium enamels can be produced in all colours and also in black and white. In the case of the white enamels, opacifiers such as $TiO_2$ are added and an appropriately high ratio of $Li_2O$ to $TiO_2$, i.e. about 1:1.5–2, then has to be selected. Coloured aluminium enamels can be produced in many shades.

By way of example, the composition of an enamel which is very useful for the purposes of the invention will once more be described here:

100 parts of frit 15 parts of phosphorescent pigment 4 parts of boric acid 2 parts of KOH 1 part of water glass 45 parts of water This mixture is milled in a porcelain mill to give a slip having a defined particle fineness of, for example, from 0.1 to 0.5 by the Bayer method and a specific gravity of, for example, from 1.5 to 2.0 g/cm$^3$, preferably from 1.7 to 1.8 g/cm$^3$.

This slip is usually applied to the part to be enamelled by a spraying method.

Further details of such aluminium enamels or the enamelling of substrates containing aluminium or aluminium alloys may be found, for example, in a review article "Mitteilungen des Vereins Deutscher Emailfachleute e.V.", volume 43, 1995 (No. 5), p. 56 ff.

The thickness of the enamel layer or layers is preferably 400 $\mu$m or less, more preferably about 300 $\mu$m or less and in particular about 200 $\mu$m or less, with the lower limit of the thickness of the enamel being about 30 $\mu$m.

In a further, preferred embodiment, a reflective layer of a white or light-coloured enamel having a reflectance of at least about 78%, more preferably at least about 82%, is first applied on one or both sides and at least one further enamel layer is then applied.

Furthermore, a reflective layer can also be produced directly on the substrate, for example by electric oxidation and/or by embedding of inorganic pigments such as $TiO_2$.

Of course, the enamel containing a phosphor can also be applied directly to the substrate without using a reflective layer.

If more than one layer containing an enamel is applied to one or both sides, it is advantageous, particularly for economic reasons, for only the outer layer containing an enamel to contain a phosphor.

Phosphors which can be used for the purposes of the present invention are in principle all known inorganic phosphors.

Examples which may be mentioned are:

Phosphors as are described, for example, in Ullmanns Encyklopädie der Technischen Chemie, 4th edition, volume 16, p. 179 ff (1975), e.g. those based on sulphides, e.g. CaS:Bi, CaSrS:Bi, ZnS:Cu and ZnCdS:Cu; phosphors based on alkaline earth metal aluminates, e.g. europium- or lead-activated alkaline earth metal aluminates, where the alkaline earth metal is strontium or a mixture of strontium and calcium, as described, for example, in EP-A-0 094 132 and U.S. Pat. No. 3,294,699 (Sr aluminate/europium), likewise europium-activated alkaline earth metal aluminates containing barium and strontium as alkaline earth metals, as described in DE-A-1 811 732;

phosphors comprising a matrix of the formula $M_{1-x}Al_2O_{4-x}$, where M is at least one metal selected from among Ca, Sr and Ba and x is a non-zero integer and the matrix contains Eu as activator and, as coactivator, at least one of La, Ce, Pr, Nd, Sm, Gd, Tb, Dy, Ho, Er, Tm, Yb, Lu, Mn, Sn and Bi, as described in EP-A-0 710 709;

phosphors comprising a composition $MO{\sim}a(Al_{1-b}B_b)_2O_3$:cR, where $0.5 \leqq a \leqq 10.0$, $0.0001 \leqq b \leqq 0.5$ and $0.0001 \leqq c \leqq 0.2$, MO is at least one divalent metal oxide selected from among MgO, CaO, SrO and ZnO, and R is Eu and at least one additional rare earth element, as described in DE-A 195 21 119;

alkaline earth metal aluminates doped with rare earth metals, as described in EP-A-0 710 709 and DE-A 195 21 119;

phosphors comprising a matrix of the formula $MAl_2O_4$, where M is calcium, strontium or barium and the matrix contains europium as activator and, as coactivator, at least one of lanthanum, cerium, praseodymium, neodymium, samarium, gadolinium, dysprosium, holmium, erbium, thulium, ytterbium, lutetium, tin and bismuth, as described in EP-B-0 622 440;

europium-activated ternary metal oxides containing SrO or BaO or mixtures thereof, $Al_2O_3$ or a mixture of $Al_2O_3$ and $Ga_2O_3$ and ZnO or MgO, as described in U.S. Pat. No. 4,216,408;

and phosphors containing at least one metal oxide selected from among MgO, CaO, SrO and ZnO, and also, as activator, $Eu^{2+}$ and at least one additional rare earth element selected from among Pr, Nd, Dy and Tm, preferably Dy, as described in U.S. Pat. No. 5,376,303.

Preference is given to using phosphors based on an alkaline earth metal aluminate, in particular the phosphors described in EP-B-0 622 440, EP-A 0 710 709, DE-A 195 21 119 and U.S. Pat. No. 5,376,303.

The amount of phosphor used is not restricted in any particular way, but for economic reasons is generally up to about 50% by weight, based on the total weight of the laminar body. The lower limit for the amount of phosphor is determined, in particular, by the desired phosphorescent intensity and can accordingly be varied within wide ranges depending on the application.

The present invention also provides a process for producing the above-described laminar body, which process comprises the following steps: application of at least one layer containing an enamel to one or both sides of a substrate and firing the applied layer or layers containing an enamel, characterized in that this layer or layers contains/contain at least one phosphor.

The application and firing of the enamel is carried out by conventional methods known from the prior art. Thus, the enamel is applied in the form of an aqueous suspension (enamel slip) or as fine powder to the substrate, for example a generally degreased and passivated foil of aluminium or aluminium alloy, with the aid of an application apparatus, e.g. a spray gun, and is subsequently fired at temperatures of from about 500 to about 600° C. When using a plurality of enamel layers, these are generally applied in succession and fired together.

The laminar body of the invention can then at any time be applied to a suitable support material, preferably a noncombustible support material, e.g. a metal plate, by adhesive bonding or welding, or else be applied directly to the article to be marked, likewise by adhesive bonding or mechanical fastening, e.g. riveting, clamping or screwing.

In a further, preferred embodiment, the layer containing an enamel and at least one phosphor can be applied by means of screen printing or other printing processes, transfers, templates, spraying with templates or manual inscription.

In addition, the present invention also provides for the use of a laminar body as described above or a laminar body produced as defined above to give an article phosphorescent properties, and also provides phosphorescent articles characterized in that they are provided with such a laminar body.

Examples of articles which are preferably provided in the context of the present invention with the laminar body of the invention are measuring instruments, clockfaces, safety signs, keys, safety railings, helmets, any type of markings such as ones in or on lifts or as traffic signs, electric switches, writing instruments, toys or household appliances and sports equipment.

Furthermore, the present invention in its most general form provides for the use of a phosphor to provide a laminar body comprising a substrate and, applied thereto on one or both sides, at least one layer containing an enamel with phosphorescent properties.

The present invention will be illustrated below with the aid of some examples.

EXAMPLE 1

In a continuously operating unit, an aluminium foil having a thickness of 80 μm was wound off a roll and ran through two degreasing baths, a rinsing bath and a passivation bath and was subsequently dried.

A white enamel was subsequently applied in a thickness of about 60 μm to both sides by means of spray guns, dried and fired.

An aluminium enamel slip to which a europium-dysprosium-doped strontium aluminate (Lumilux® Grün SN from Riedel-de Haën) had been added as phosphor in an amount of 40% by weight, based on the enamel, was then applied and this enamel coating was dried and continuously fired. The foil was then again wound up onto a roll.

In subsequent use, appropriate lengths were wound off this roll and used directly.

EXAMPLE 2

An aluminium foil having a thickness of 100 μm, which already had a whitish colour as a result of embedding of $TiO_2$, was first pretreated anodically and subsequently, while hanging free, coated on the reverse side with a waste aluminium enamel and on the front side with an enamel slip to which a phosphor as in Example 1 had been added and the enamel was subsequently dried and fired. The thickness of the enamel layer obtained was 150 μm.

EXAMPLE 3

A 3 mm thick sheet of the aluminium alloy AlFeSi was degreased with alkali, then rinsed with demineralized water and dried. A slip was then prepared according to the following formulation:

100 parts of aluminium frit 15 parts of floating agent 40 parts of water 12 parts of $TiO_2$ This slip was applied to the aluminium alloy sheet by spraying, dried and fired at 570° C.

Subsequently, a further slip was prepared according to the following formulation:

100 parts of aluminium frit 30 parts of floating agent 60 parts of water 200 parts of phosphorescent pigment This slip was processed in the same way as described above.

EXAMPLE 4

A body made of a sand casting alloy was degreased with alkali, rinsed a number of times and passivated using $HNO_3$, and then dried. This body was coated with a white slip as in Example 3 and fired. A slip was then prepared according to the following formulation:

100 parts of aluminium frit 60 parts of water 25 parts of floating agent 250 parts of phosphor This slip was dried, pulverized, dusted onto the casting and fired.

What is claimed is:

1. A laminar body comprising a substrate and, applied thereto on at least one side, at least one layer containing an enamel, said at least one layer containing an enamel containing at least one phosphor comprising an alkaline earth metal aluminate.

2. The laminar body of claim 1, wherein said enamel is produced from an enamel fit containing heavy metals.

3. The laminar body of claim 1, wherein said at least one phosphor comprises an alkaline earth metal aluminate doped with rare earth elements.

4. A process for producing a laminar body, comprising the steps of:

(a) applying at least one layer containing an enamel to at least one side of a substrate, and (b) firing said applied at least one layer containing an enamel, wherein, said at least one layer containing an enamel contains at least one phosphor comprising an alkaline earth metal aluminate.

5. A phosphorescent article comprising a laminar body according to claim 1.

6. A phosphorescent article comprising a laminar body produced according to the method of claim 4.

* * * * *